(12) United States Patent
Chin et al.

(10) Patent No.: US 10,938,716 B1
(45) Date of Patent: Mar. 2, 2021

(54) PRESERVING POLICY WITH PATH SELECTION

(71) Applicant: Riverbed Technology, Inc., San Francisco, CA (US)

(72) Inventors: Bill Y. Chin, Sunnyvale, CA (US); Arun Natarajan, Milpitas, CA (US); Arthur L. Jones, Larkspur, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 49 days.

(21) Appl. No.: 16/205,016

(22) Filed: Nov. 29, 2018

Related U.S. Application Data

(60) Provisional application No. 62/592,301, filed on Nov. 29, 2017.

(51) Int. Cl.
*H04L 12/715* (2013.01)
*H04L 29/06* (2006.01)
*H04L 12/721* (2013.01)

(52) U.S. Cl.
CPC .............. *H04L 45/64* (2013.01); *H04L 45/38* (2013.01); *H04L 69/22* (2013.01)

(58) Field of Classification Search
CPC .......... H04L 45/64; H04L 69/22; H04L 45/38
See application file for complete search history.

(56) References Cited

U.S. PATENT DOCUMENTS

2015/0295819 A1* 10/2015 Kamath ................. H04L 69/22
370/392

* cited by examiner

*Primary Examiner* — Dady Chery

(74) *Attorney, Agent, or Firm* — Park, Vaughan, Fleming & Dowler LLP; Laxman Sahasrabuddhe

(57) ABSTRACT

Systems and techniques are described for ensuring that policies are consistently applied to traffic across an overlay network. An application identifier associated with a forward traffic flow and a corresponding reverse traffic flow can be determined by a device that routes packets of both the forward traffic flow and the corresponding reverse traffic flow. Next, an overlay header can be added to each packet in the forward traffic flow and to each packet in the corresponding reverse traffic flow, wherein the overlay header comprises the application identifier, a policy identifier, and a policy action. Each device in the overlay network can then apply the policy action specified in the overlay header of each packet that it routes.

12 Claims, 9 Drawing Sheets

PRESERVING POLICY WITH PATH SELECTION

RELATED APPLICATION

This application claims benefit of U.S. Provisional Patent Application No. 62/592,301, entitled "STEELCONNECT PRESERVING POLICY WITH PATH SELECTION," by the same inventors, filed on 29 Nov. 2017, the contents of which are herein incorporated by reference in their entirety for all purposes.

BACKGROUND

The present disclosure generally relates to preserving policy with path selection. In a large and complex software-defined wide-area-network (SD-WAN), source and destination sites may not be directly connected by a single overlay tunnel. Multiple WANs and uplinks provide alternative tunnel connectivity. One or more transit hubs could be involved to provide end to end connectivity. Additionally, large sites and datacenters may have multiple entry and exit points in the SD-WAN. Even high availability deployed at individual sites can lead to different entry and exit points. All of this put together means that traffic may be routed through a large number of possible paths between a source and destination site.

In such situations, it is difficult for an SD-WAN to guarantee that policies are applied consistently to traffic across the SD-WAN regardless of which path the traffic takes. To complicate matters even further, the path that a given traffic flow takes can change dynamically due to outages, traffic congestion, policy changes, and other factors.

In one existing solution, a central controller distributes flow information to SD-WAN gateways on all possible paths. This solution clearly has scalability issues. Another existing solution is for multiple appliances at a single site to synchronize flow state such that all appliances know about all flows. Such state sharing techniques are quite complex and have limitations.

Therefore, what are needed are techniques and systems for consistently applying policies to traffic across a large and complex SD-WAN without the above-described drawbacks.

SUMMARY

Embodiments described herein feature methods and apparatuses for ensuring that policies are consistently applied to traffic across an overlay network. A device in an overlay network that routes packets of both a forward traffic flow and a corresponding reverse traffic flow can determine an application identifier associated with the forward traffic flow and the corresponding reverse traffic flow. Next, the device can add an overlay header (OH) to each packet in the forward traffic flow, wherein the OH comprises the application identifier, a policy identifier, and a policy action. Another device in the overlay network that is near the destination of the forward traffic flow (and is therefore near the source of the corresponding reverse traffic flow), can add an OH to packets in the corresponding reverse traffic flow. Each device in the overlay network can then apply the policy action specified in the OH of each packet.

In some scenarios, (1) a forward traffic flow may originate at a first network site and end at a second network site, and (2) the second network site may include a first device and a second device, wherein the forward traffic flow passes through the first device and the corresponding reverse traffic flow passes through the second device. In these scenarios, the first device in the overlay network can receive a packet in the forward traffic flow. Next, the first device can extract an OH from the packet. The first device can then send the OH information to the second device that routes packets of the corresponding reverse traffic flow. Next, the second device can add an OH (which contains the same information as the OH that was extracted from the packet in the forward traffic flow) to each packet in the corresponding reverse traffic flow.

In some embodiments, a set of policies can be defined in the overlay network to force the forward traffic flow and the corresponding reverse traffic flow to pass through the same device, thereby enabling the device to determine an application identifier by analyzing the packets in the forward traffic flow and the corresponding reverse traffic flow. Once the application identifier has been determined, it can be used to send an OH in each packet, thereby ensuring that policies are consistently applied across the SD-WAN.

Specifically, in some embodiments, the set of policies in the overlay network can include a first policy that directs reverse traffic flows associated with an unidentified application identifier to a default device in a network site. Additionally, the set of policies can include a second policy that directs forward traffic flows associated with an unidentified application identifier to the default device. The combination of the first and second policies ensure that all forward traffic flows that originate from the network site, and the corresponding reverse traffic flows pass through the default device, thereby enabling the default device to determine the application identifier. In some embodiments, the set of policies in the overlay network can include a third policy to correct asymmetric routing.

DETAILED DESCRIPTION

Figure 1:
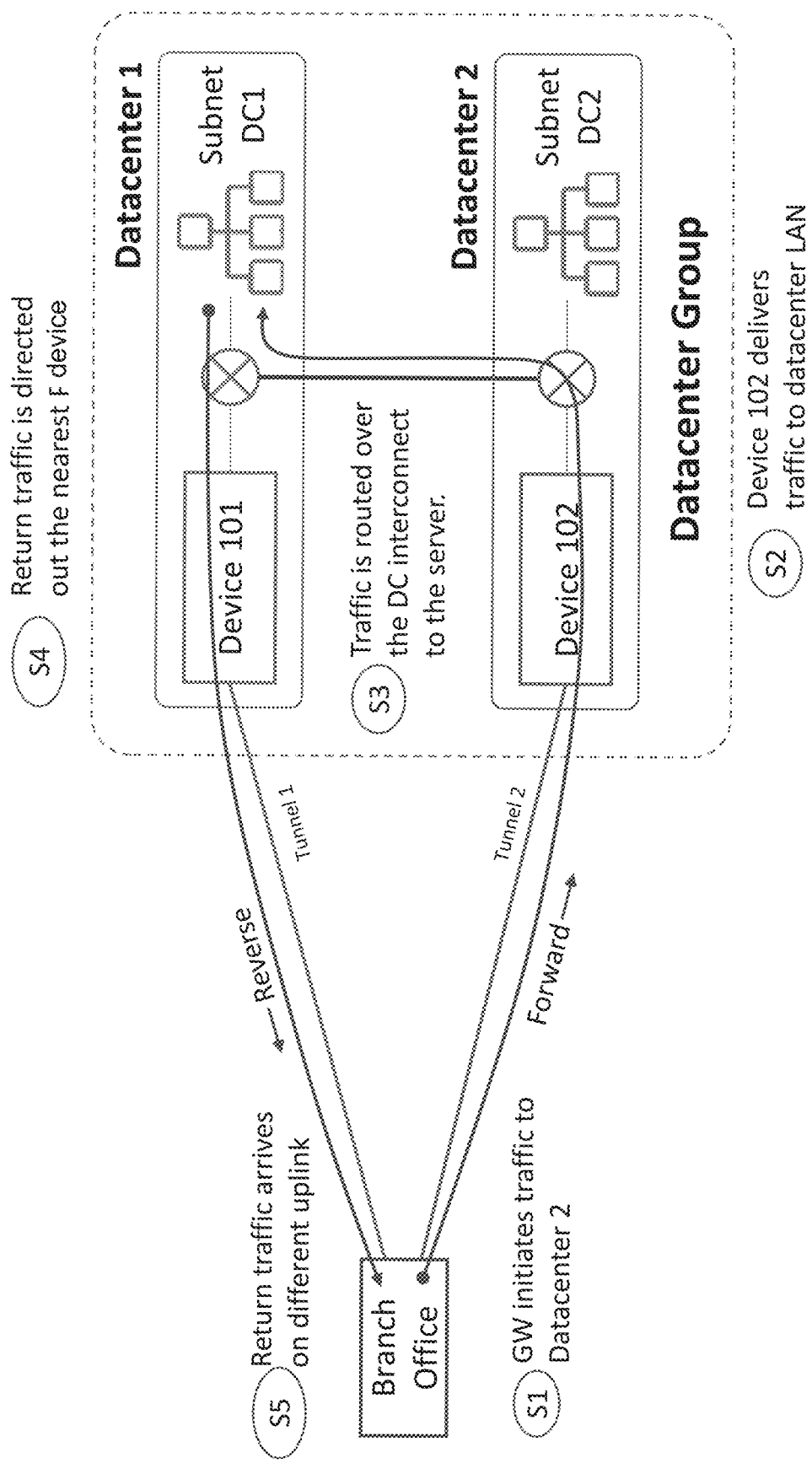
FIG. 1 illustrates a problem scenario in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

According to one definition, a computer is any device that is capable of performing computations. In some embodiments, a computer can include a processing mechanism that is capable of executing instructions stored on a storage medium. Examples of computers include, but are not limited to, handheld computers, laptop computers, desktop computers, distributed computers, printers, appliances, etc.

According to one definition, a data communication network (or "network" for short) is an interconnection of one or more devices that is capable of delivering information from one computer to another computer. Examples of networks include, but are not limited to, wireless and wired networks, local area networks (LANs), metropolitan area networks (MANs), wide area networks (WANs), private networks, public networks, intranets, internets, etc. Data communication networks often include a variety of network devices for sending, receiving, directing, and optimizing network data traffic.

WAN optimization devices optimize network traffic to improve WAN performance in reading and/or writing data over a network. WAN optimization devices typically compress data (e.g., by performing de-duplication) and perform other optimization tasks (e.g., caching, prefetching, etc.) to improve WAN performance. WAN optimization devices may operate singly or in pairs at each side of a WAN connection to optimize network traffic. WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers.

Techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. In this disclosure, the term "WAN optimization device" is used to refer to such devices and applications and "WAN optimization" is used to refer to such techniques.

Communication between two nodes of a network is typically accomplished by using a layered software architecture, which is often referred to as a networking software stack or simply a networking stack. A given functionality in a networking stack can be implemented using hardware or software or a combination thereof. The decision to implement a specific functionality in hardware or software is typically based on a tradeoff between performance and cost.

Each layer is usually associated with one or more protocols which define the rules and conventions for processing packets in that layer. Each lower layer performs a service for the layer immediately above it to help with processing packets, and each layer typically adds a header (control data) that allows peer layers to communicate with one another. At the sender, this process of adding layer specific headers is usually performed at each layer as the payload moves from higher layers to lower layers. The receiving host generally performs the reverse of this process by processing headers of each layer as the payload moves from the lowest layer to the highest layer.

Some embodiments described in this disclosure add a header that contains the appropriate metadata to each packet, thereby enabling any SD-WAN appliance along the path to enforce policy correctly for the packet. An important feature in these embodiments is to guarantee that the application identifier (ID) can be learned for all possible scenarios without requiring an overly complex control plane. Identifying the application ID may require seeing and analyzing the first set of packets of a flow in both directions (some applications can be identified by just observing the forward direction of the flow, so seeing both directions of the flow is not required for such applications). However, this doesn't always happen organically.

For example, consider FIG. 1, which illustrates a problem scenario in accordance with some embodiments described herein. In FIG. 1, a branch site ("Branch Office") is communicating with a split datacenter ("Datacenter 1" and "Datacenter 2"). The sequence of communication steps are illustrated in FIG. 1 by using labels S1-S5. As shown in the figure, due to asymmetric routing, the forward direction from the branch site is received on device 102 at the datacenter (DC) and the reverse direction exits via device 101 of the DC toward the branch. In this case device 101 never learns the application ID, even if the information is put in a header by the branch site. Some embodiments described herein solve the problem in such scenarios by having the branch recognize this situation and redirect the forward flow to device 101. Other embodiments described herein solve the problem by having device 102 share the policy related information (application ID, etc.) with device 101, so that device 101 can add an appropriate header to the reverse traffic flow. Further details of these embodiments are described below.

Figure 2:
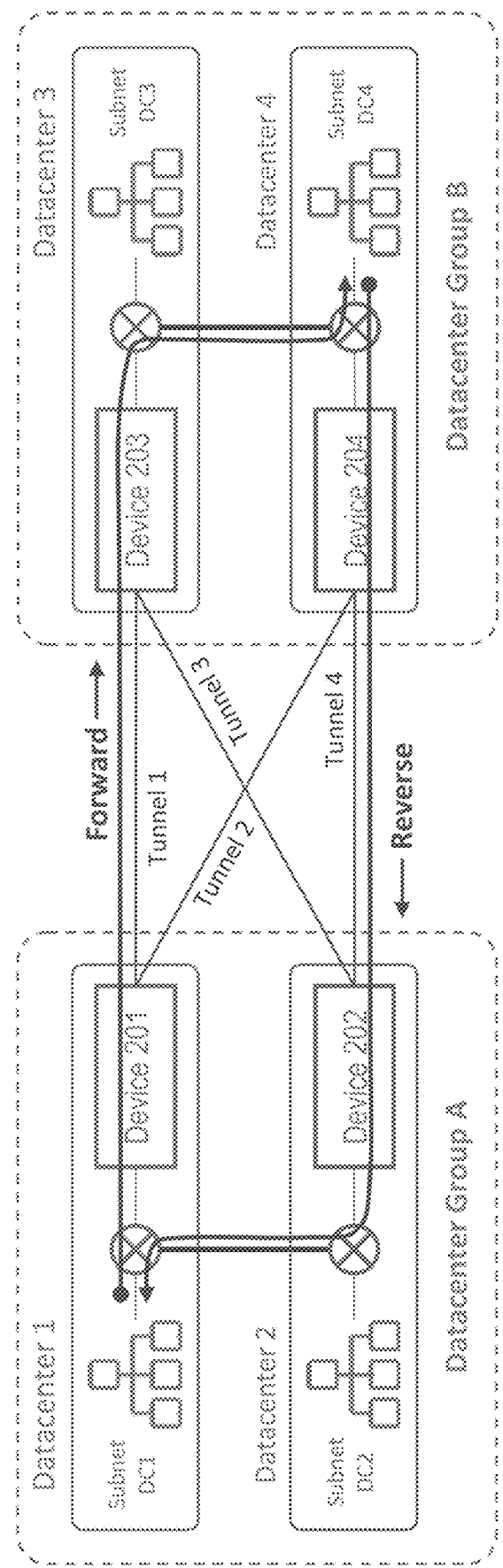
FIG. 2 illustrates a problem scenario in accordance with some embodiments described herein.

FIG. 2 illustrates a problem scenario in accordance with some embodiments described herein. FIG. 2 shows a more complex scenario when there are multiple appliances (shown as Device 201 through Device 204) on both the source site (Datacenter Group A) and the destination site (Datacenter Group B). This can be caused by a split datacenter or a high availability (HA) deployment. Some embodiments described herein solve this problem by defining a default overlay policy for flows with unidentified application IDs. Such a policy forces unidentified flows (or grouping of such flows) to pass through a specific device or appliance. This solves the problem if the return flow uses the same appliance as the forward flow. However, if the return flow uses a different appliance, then some embodiments define an additional default policy to direct the sending site to always originate unidentified flows from the same default appliance used for receiving. This will force the default appliance to learn the application ID and then the appropriate policy can be enforced. Further details of these embodiments are described below.

Figure 3:
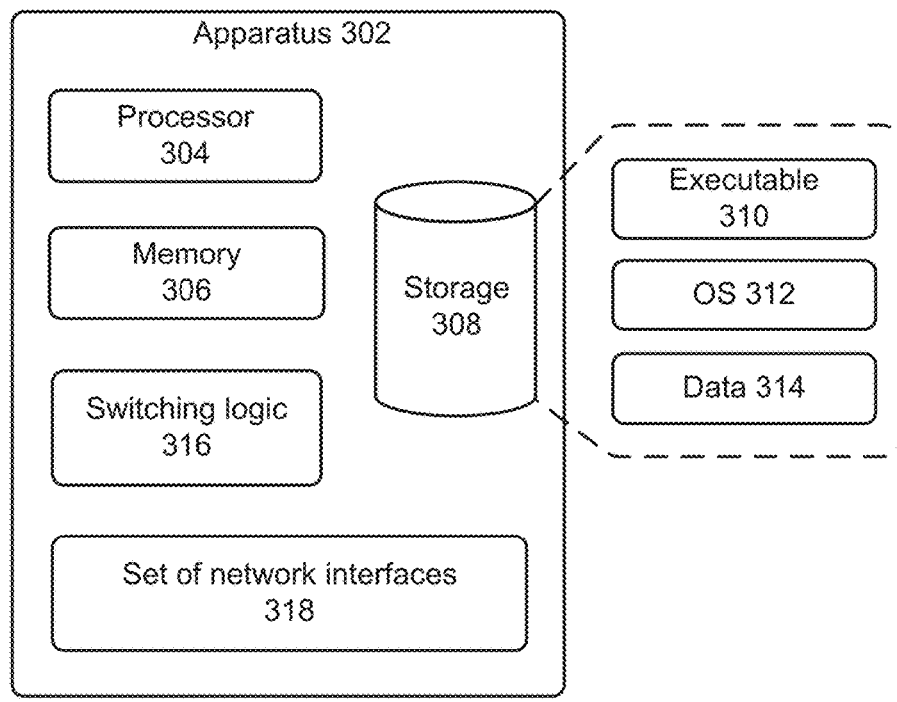
FIG. 3 illustrates an apparatus in accordance with some embodiments described herein.

FIG. 3 illustrates an apparatus in accordance with some embodiments described herein. Apparatus 302 (e.g., a network device, an appliance, etc.) comprises processor 304, memory 306 (e.g., a volatile or non-volatile random access memory), and storage 308 (e.g., a flash memory device or a disk drive). Storage 308 can store executable 310, operating system 312, and data 314. The components in apparatus 302 can communicate with one another using a communication mechanism, e.g., a bus, a backplane, and/or a switching fabric. Executable 310 can include instructions that, when executed by processor 304, cause apparatus 302 to perform one or more methods that are implicitly or explicitly described in this disclosure. Data 314 can include any data that is inputted into or outputted by executable 310.

Apparatus 302 can also include switching logic 316 and set of network interfaces 318. Set of network interfaces 318 can be used to transmit data to and/or receive data from other communication devices. Switching logic 316 can forward network traffic received on one or more network interfaces in accordance with switching/forwarding/routing information stored in apparatus 302. Specifically, switching logic 316 can be configured by processor 304 in accordance with one or more methods that are implicitly or explicitly described in this disclosure.

Figure 4:
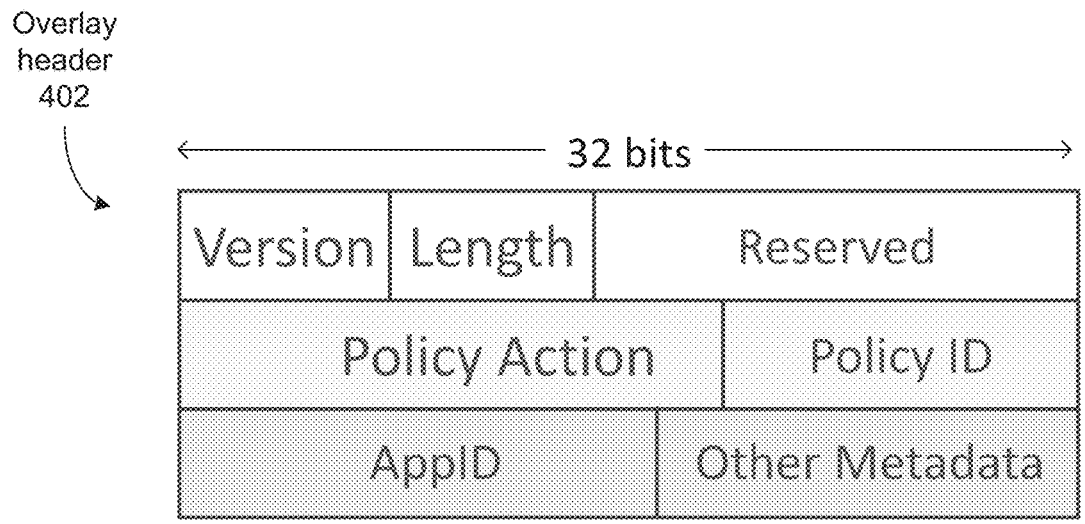
FIG. 4 illustrates an OH in accordance with some embodiments described herein.

FIG. 4 illustrates an OH in accordance with some embodiments described herein. OH 402 can include an "AppID" field, which can store the application ID once the application ID has been determined based on the first set of packets of a flow in both directions. The "Policy ID" field can store the policy ID that is to be applied to the packet, and the "Policy Action" field can store the policy action that is to be applied to the packet. Some embodiments can add an OH to each packet, and the OH can be used by the SD-WAN devices to ensure that a consistent policy is applied to each packet across the entire SD-WAN.

Figure 5:
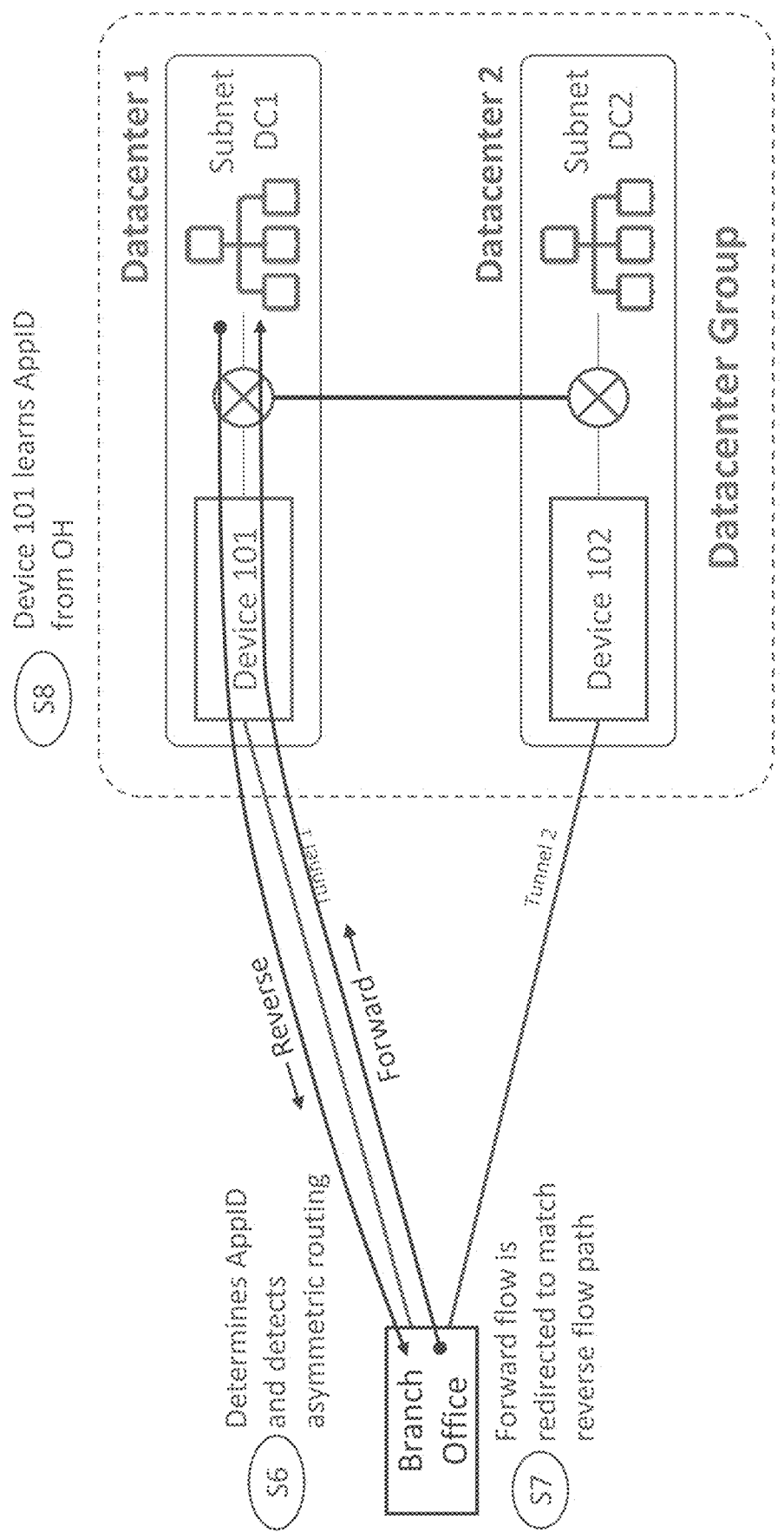
FIG. 5 illustrates how the problem scenario shown in FIG. 1 can be solved in accordance with some embodiments described herein.

FIG. 5 illustrates how the problem scenario shown in FIG. 1 can be solved in accordance with some embodiments described herein. The sequence of steps S6-S8 illustrate the steps that are taken, in some embodiments, to solve the problem shown in FIG. 1. In FIG. 5, it is assumed that the branch office device has a policy to fix asymmetric routing. In accordance with that policy, the branch office device can redirect the forward traffic flow to device 101 in the datacenter. Note that the branch office device (shown as "Branch Office" in FIG. 5) receives both the forward and the reverse traffic flows. Therefore, the branch office device (e.g., an SD-WAN appliance) can analyze the first set of packets in the forward and reverse traffic flows, and determine the application ID. Next, the branch office device can add an OH to all subsequent packets in the forward traffic flow, wherein the OH includes the application ID that was determined by the branch office device, and also includes the policy ID and the policy action for the traffic flow. Device 101 then learns the application ID from the branch office device (because the packets received at device 101 from the branch office device contain the application ID in the OH). Once device 101 learns the application ID, the policy ID, and the policy action, it can apply the appropriate policy to the packets, and start adding an appropriate OH in the reverse traffic flow.

Figure 6:
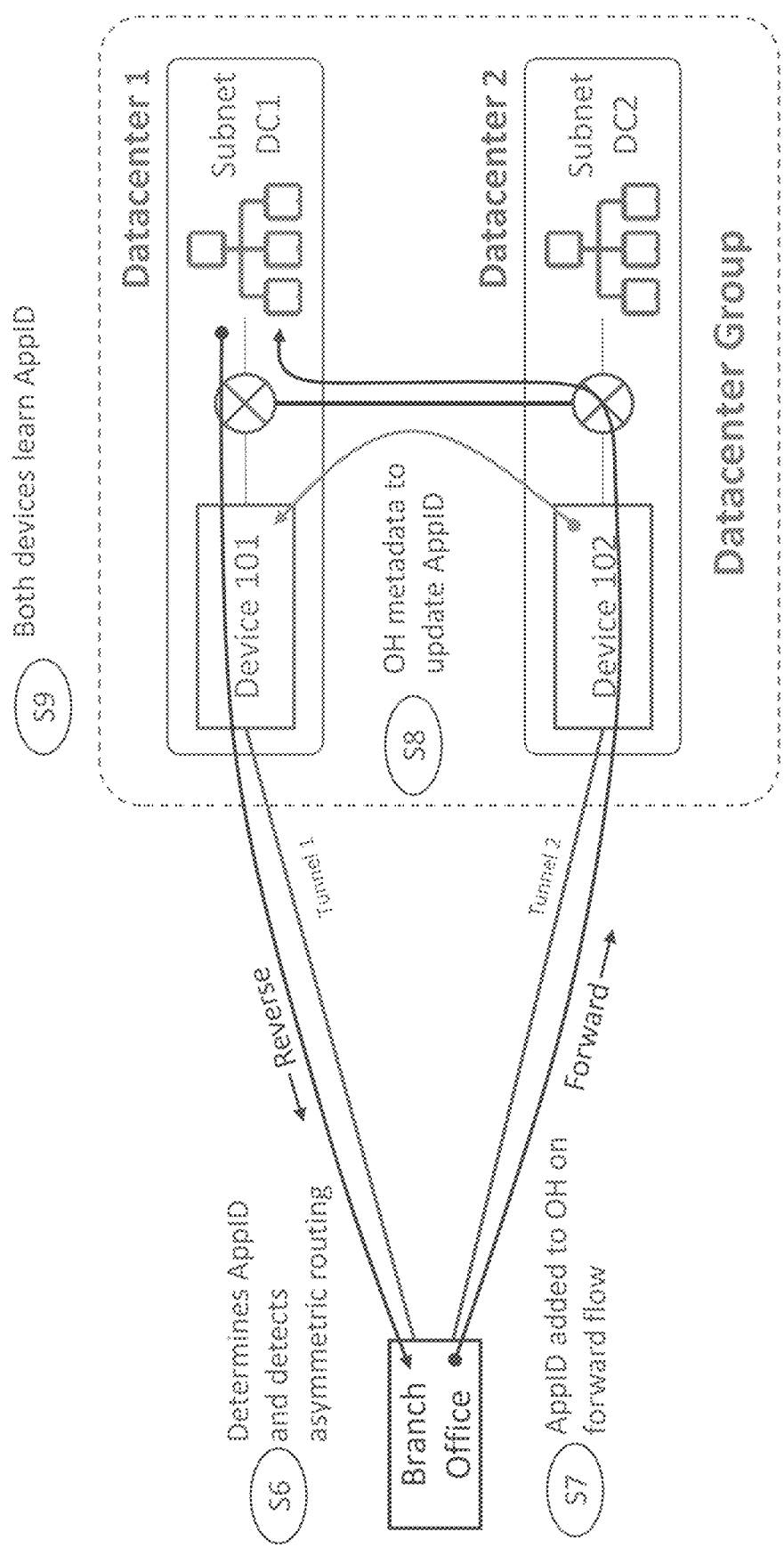
FIG. 6 illustrates how the problem scenario shown in FIG. 1 can be solved in accordance with some embodiments described herein.

FIG. 6 illustrates how the problem scenario shown in FIG. 1 can be solved in accordance with some embodiments described herein. The sequence of steps S6-S9 illustrate the steps that are taken, in some embodiments, to solve the problem shown in FIG. 1. In FIG. 6, it is assumed that the branch office device does not have a policy to fix asymmetric routing. The branch office device learns the application ID by analyzing the first set of packets in the flow in both directions, and updates the OH in the forward flow. Because a policy to fix asymmetric routing does not exist in the branch office device, the forward and reverse traffic flows continue to pass through different devices in the Datacenter Group. Device 102 in the datacenter learns the application ID, the policy ID, and the policy action from the OH of packets that were received in the forward traffic flow from the branch office device. Device 102 can realize this particular flow is asymmetric by the presence of the OH. Device 102 can then share or send the OH information to device 101. Note that, only for asymmetric flows is the OH meta data shared with device 101 (i.e., the OH meta data is not shared for all flows). Next, device 101 can add the OH to packets in the reverse traffic flow. Now, all SD-WAN devices in the entire forward and reverse flows are aware of the application ID, policy ID, and the policy action, and so the same policy rules can be consistently applied across the SD-WAN.

Figure 7A:
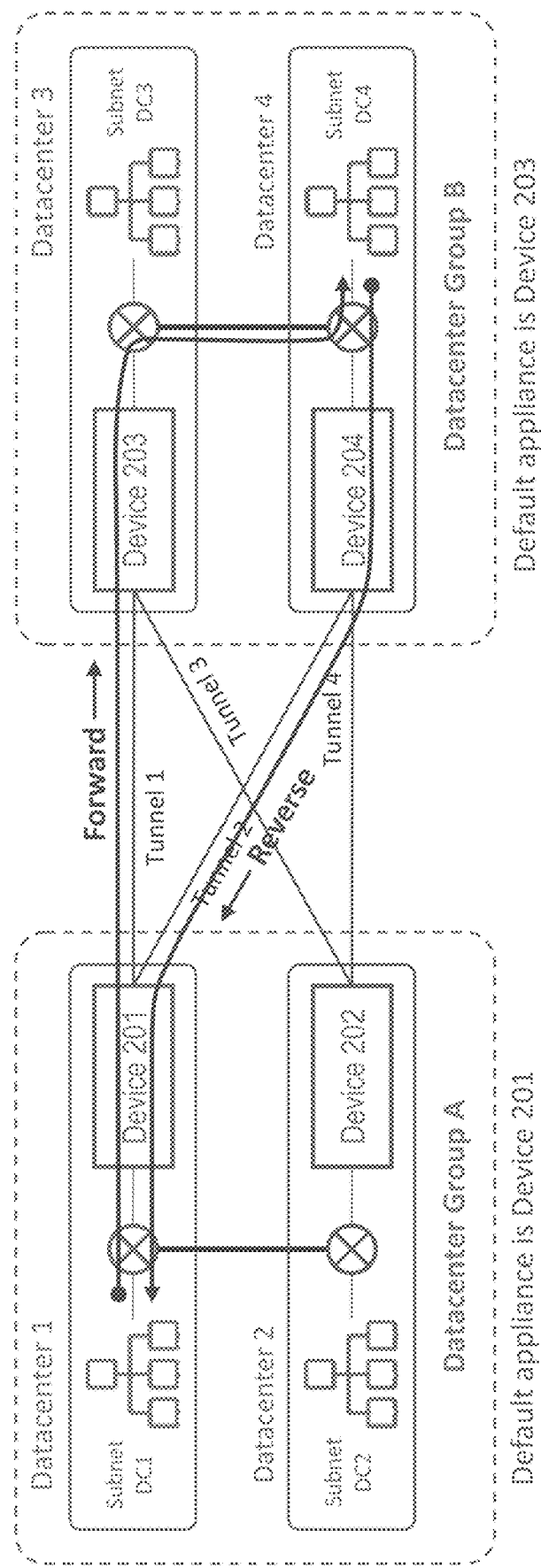
FIGS. 7A-7C illustrate how the problem scenario shown in FIG. 2 can be solved in accordance with some embodiments described herein.
Figure 7B:
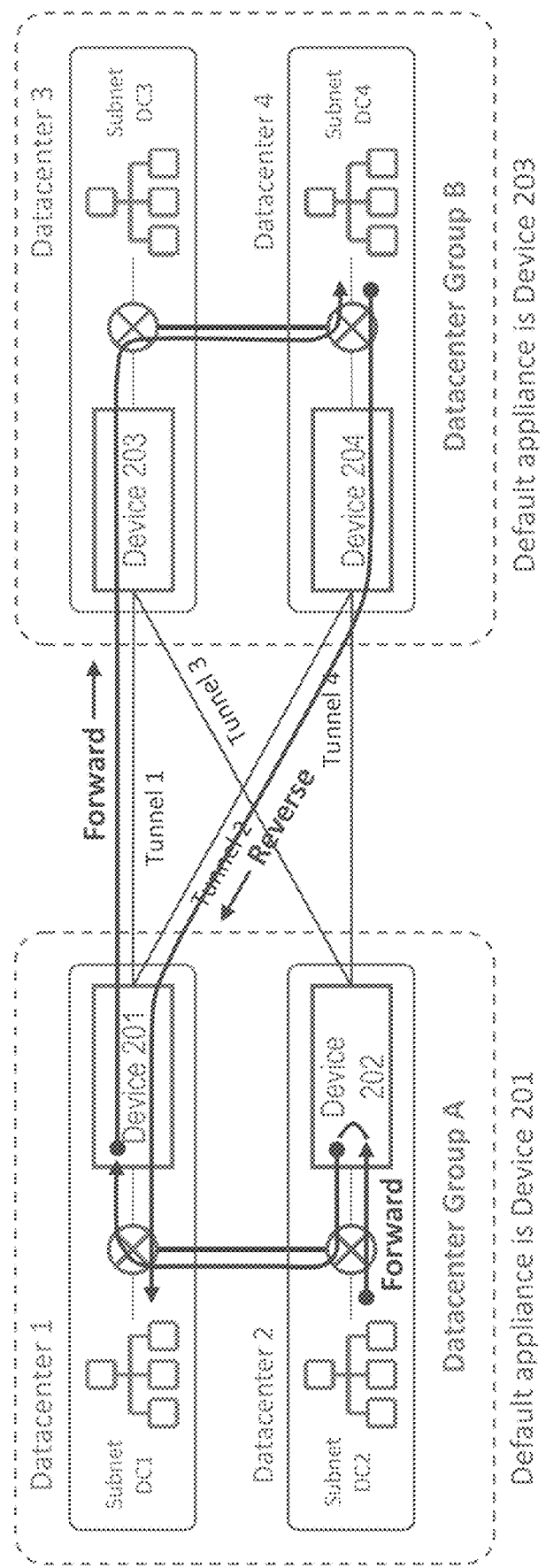
Figure 7C:
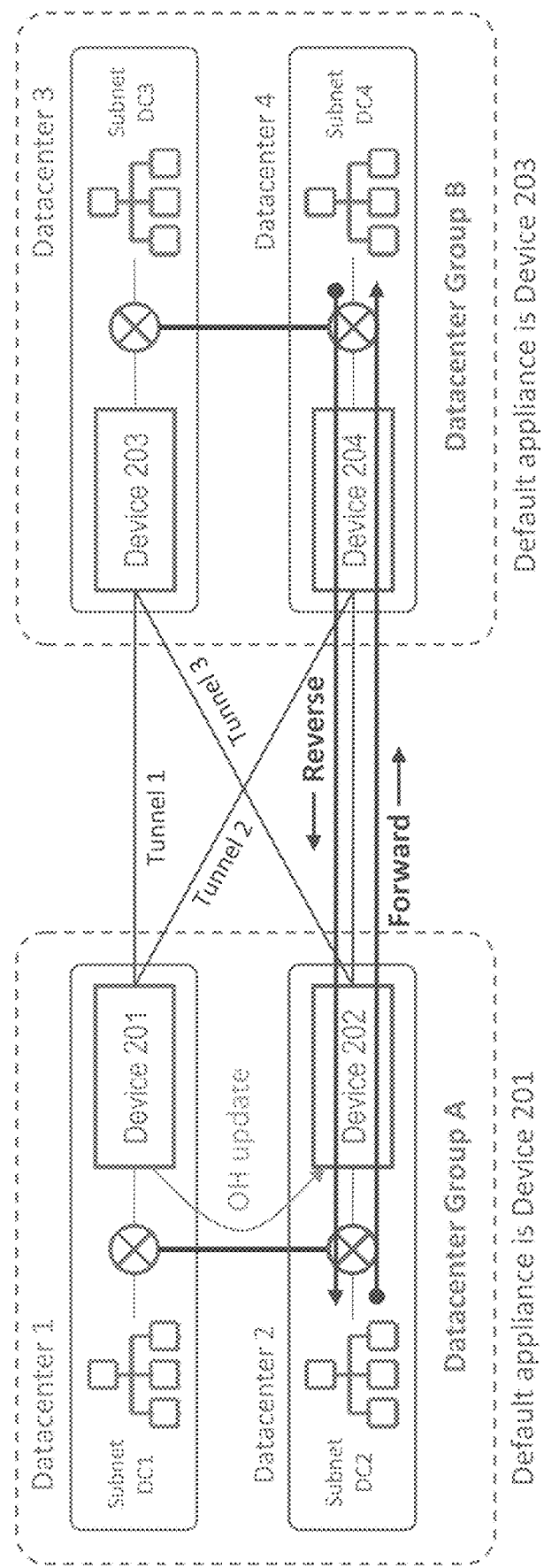

FIGS. 7A-7C illustrate how the problem scenario shown in FIG. 2 can be solved in accordance with some embodiments described herein. First, a default policy can be defined for flows with unidentified application IDs. The default policy deterministically directs flows to a specific SD-WAN appliance of a Datacenter Group. As shown in FIG. 7A, the default appliance in Datacenter Group A is device 201, and the default appliance in Datacenter Group B is device 203. This default policy forces one SD-WAN appliance to see both directions of a flow allowing it to determine the application ID. For example, in FIG. 7A, Device 201 receives the reverse flow due to this policy (in contrast, in FIG. 2, the reverse flow went to Device 202 instead of Device 201). Since both the forward flow and the reverse flow are visible to the default appliance, i.e., Device 201, it can determine the application ID. Once the application ID has been learned, proper application policy can be applied end-to-end by using the OH.

Additionally, a default policy is defined to specify which SD-WAN appliance to use in the forward direction. This default policy will force data traffic in each direction to pass through a single appliance. For example, in FIG. 7B, the forward flow originates from Device 202. However, because the default device for the forward flow is Device 201, the forward flow is first routed to Device 201, and then it is routed to Datacenter Group B. This ensures that Device 201 sees the forward flow even when the forward flow originates at a different appliance in Datacenter Group A. As before, Device 201 can then analyze the packets in the forward and reverse flows, learn the application ID, and add an OH with the appropriate information so that the proper policy is applied to the packets across the SD-WAN.

In some embodiments, a policy can be defined to fix asymmetric routing. In these embodiments, the OH information can be shared or sent from the default device, i.e., Device 201, to Device 202 in Datacenter Group A. The asymmetric routing can be fixed by forcing the forward traffic to the same appliance as the reverse traffic. Additionally, Device 202 can add the appropriate OH to the forward traffic flow because it received the OH information from Device 201. This solution is illustrated in FIG. 7C.

The examples shown in FIGS. 1-7 included at most two sites within a datacenter group (e.g., Datacenter Group B included the two sites Datacenter 3 and Datacenter 4). However, it will be evident to a person having ordinary skill in the art that the techniques and systems described herein can be used when a Datacenter Group includes more than two sites, e.g., N sites in general. In such situations, the OH metadata can be broadcast to all group members as needed. Note that the size of N is expected to be small for a datacenter WAN block.

Figure 8:
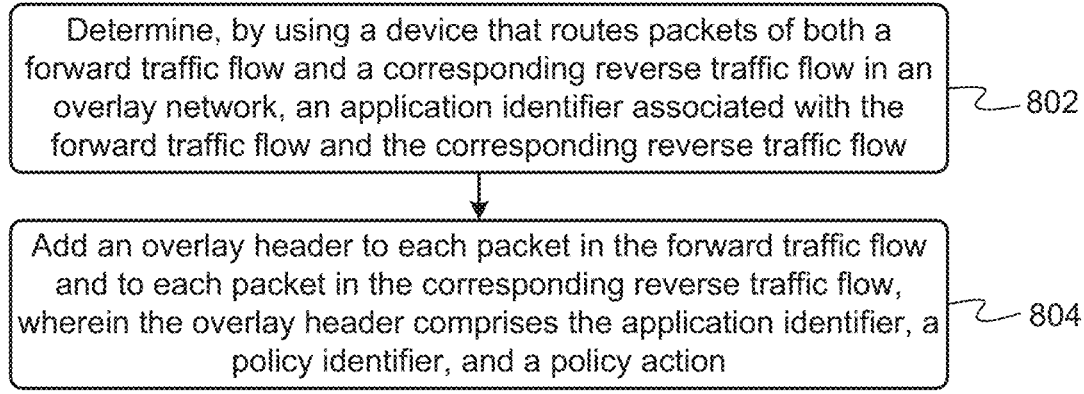
FIG. 8 illustrates a process for ensuring that policies are consistently applied to traffic across an overlay network in accordance with some embodiments described herein.

FIG. 8 illustrates a process for ensuring that policies are consistently applied to traffic across an overlay network in accordance with some embodiments described herein. The process can begin by determining, by using a device that routes packets of both a forward traffic flow and a corresponding reverse traffic flow in an overlay network, an application identifier associated with the forward traffic flow and the corresponding reverse traffic flow (step 802). Next, the process can add an OH to each packet in the forward traffic flow and the corresponding reverse traffic flow, wherein the OH comprises the application identifier, a policy identifier, and a policy action (step 804).

In some embodiments, each device in the overlay network applies the policy action specified in the OH of each packet. In some embodiments, a set of policies in the overlay network includes a first policy to correct asymmetric routing.

In some embodiments, the process can receive, at a first device in the overlay network, a first packet in the forward traffic flow. Next, the process can extract, by using the first device, a first OH of the first packet. The process can then send, by using the first device, information contained in the first OH to a second device that routes packets of the corresponding reverse traffic flow. Next, the process can add, by using the second device, a second OH to each packet in the corresponding reverse traffic flow, wherein the second OH includes the information contained in the first OH.

In some embodiments, a set of policies in the overlay network includes a first policy that directs reverse traffic flows associated with an unidentified application identifier to a default device. In some embodiments, the set of policies in the overlay network includes a second policy that directs forward traffic flows associated with the unidentified application identifier to the default device. In some embodiments, the set of policies in the overlay network includes a third policy to correct asymmetric routing.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for ensuring that policies are consistently applied to traffic across an overlay network, the method comprising:
   receiving, at a first device in the overlay network, a first packet in a forward traffic flow;
   extracting, by the first device, a first overlay header of the first packet;
   sending, by the first device, information contained in the first overlay header to a second device in the overlay network that routes packets of a corresponding reverse traffic flow; and
   adding, by the second device, a second overlay header to each packet in the corresponding reverse traffic flow, wherein the second overlay header includes the information contained in the first overlay header.

2. The method of claim 1, wherein each device in the overlay network applies the policy action specified in the overlay header of each packet.

3. The method of claim 1, wherein a set of policies in the overlay network includes a first policy that directs reverse traffic flows associated with an unidentified application identifier to a default device.

4. The method of claim 3, wherein the set of policies in the overlay network includes a second policy that directs forward traffic flows associated with the unidentified application identifier to the default device.

5. A non-transitory computer-readable storage medium storing instructions that, when executed by a first device in an overlay network, cause the first device to perform a method for ensuring that policies are consistently applied to traffic across the overlay network, the method comprising:
   receiving, at the first device, a first packet in a forward traffic flow;
   extracting, by the first device, a first overlay header of the first packet; and
   sending, by the first device, information contained in the first overlay header to a second device in the overlay network that routes packets of a corresponding reverse traffic flow, thereby causing the second device to add a second overlay header to each packet in the corresponding reverse traffic flow, wherein the second overlay header includes the information contained in the first overlay header.

6. The non-transitory computer-readable storage medium of claim 5, wherein each device in the overlay network applies the policy action specified in the overlay header of each packet.

7. The non-transitory computer-readable storage medium of claim 5, wherein a set of policies in the overlay network includes a first policy that directs reverse traffic flows associated with an unidentified application identifier to a default device.

8. The non-transitory computer-readable storage medium of claim 7, wherein the set of policies in the overlay network includes a second policy that directs forward traffic flows associated with the unidentified application identifier to the default device.

9. A first device in an overlay network, comprising:
   a processor; and
   a non-transitory computer-readable storage medium storing instructions that, when executed by the processor, cause the first device to perform a method for ensuring that policies are consistently applied to traffic across the overlay network, the method comprising:
   receiving, at the first device, a first packet in a forward traffic flow;

extracting, by the first device, a first overlay header of the first packet; and sending, by the first device, information contained in the first overlay header to a second device in the overlay network that routes packets of a corresponding reverse traffic flow, thereby causing the second device to add a second overlay header to each packet in the corresponding reverse traffic flow, wherein the second overlay header includes the information contained in the first overlay header.

10. The first device of claim 9, wherein each device in the overlay network applies the policy action specified in the overlay header of each packet.

11. The first device of claim 9, wherein a set of policies in the overlay network includes a first policy that directs reverse traffic flows associated with an unidentified application identifier to a default device.

12. The first device of claim 11, wherein the set of policies in the overlay network includes a second policy that directs forward traffic flows associated with the unidentified application identifier to the default device.

* * * * *